June 16, 1931.  P. BASTIAN, JR  1,810,811
MACHINE FOR MILLING AND PLANING PROFILED
ELEMENTS OF WOOD, LEATHER, AND THE LIKE
Filed Dec. 20, 1927    2 Sheets-Sheet 1
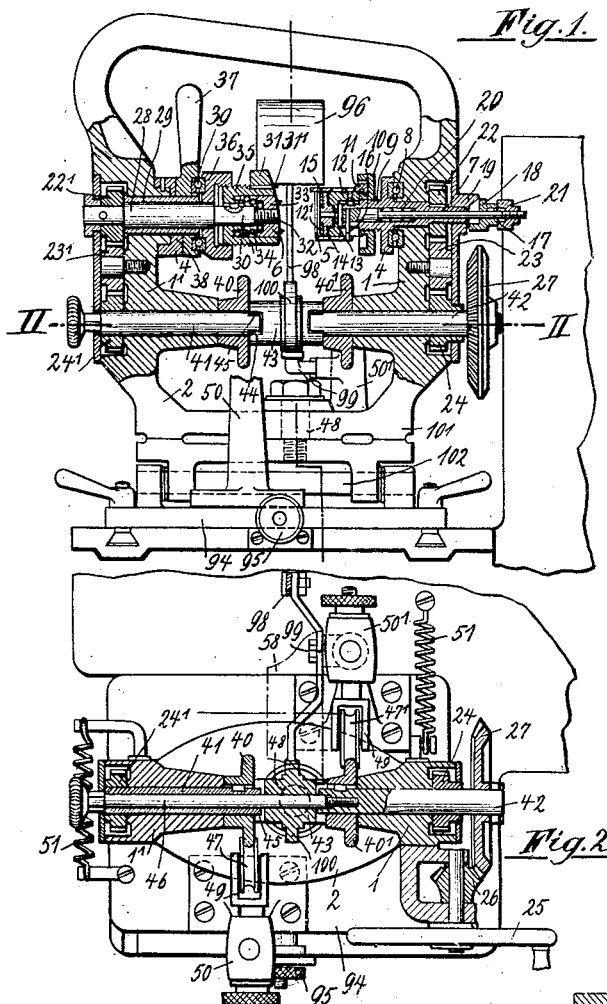
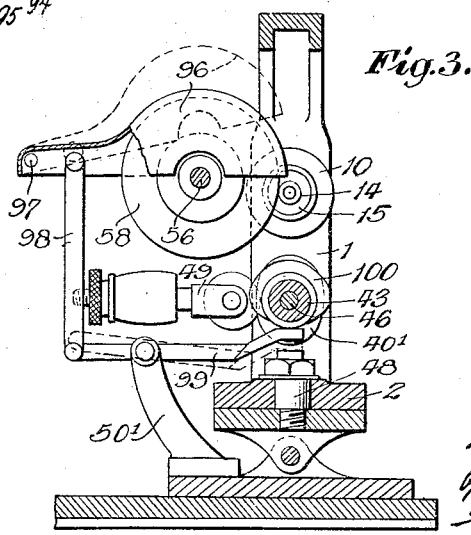

June 16, 1931. P. BASTIAN, JR 1,810,811
MACHINE FOR MILLING AND PLANING PROFILED
ELEMENTS OF WOOD, LEATHER, AND THE LIKE
Filed Dec. 20, 1927 2 Sheets-Sheet 2
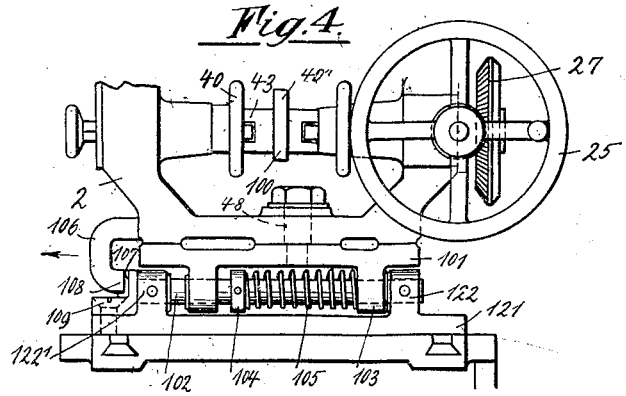
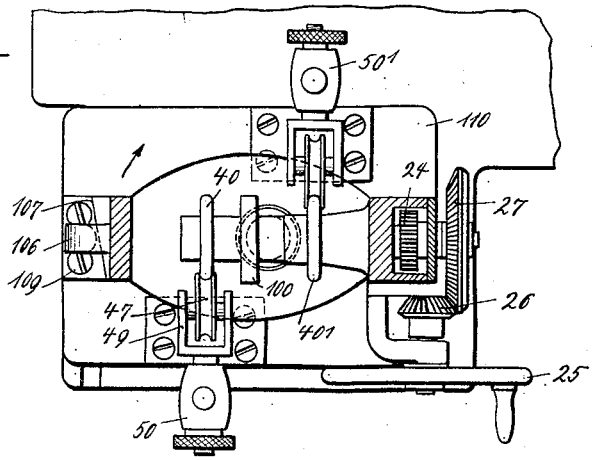
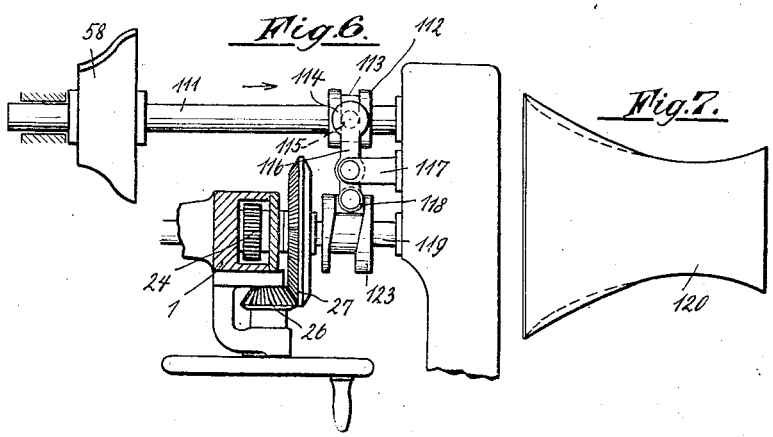

Patented June 16, 1931

1,810,811

UNITED STATES PATENT OFFICE

PAUL BASTIAN, JR., OF STUTTGART-OBERTURKHEIM, GERMANY, ASSIGNOR TO THE FIRM FORTUNA-WERKE SPEZIALMASCHINENFABRIK AKTIENGESELLSCHAFT, OF STUTTGART-CANNSTATT, GERMANY

MACHINE FOR MILLING AND PLANING PROFILED ELEMENTS OF WOOD, LEATHER, AND THE LIKE

Application filed December 20, 1927, Serial No. 241,408, and in Germany March 10, 1926.

With the machines and apparatus of known type, as copying machines, it is possible only to copy articles, according to templates, altering of the same being impossible, so that the form of the article to be produced depends on the template.

This inconvenience is avoided, according to the invention and the improved machine is adapted for producing profiled elements of symmetrical or unsymmetrical cross-section of any kind or form from wood, leather, vulcanite, hard paper, rubber and the like. The apparatus may be used independently or in conjunction with wood-working-machines, such as spoke-copying machines, planing machines, milling machines, wood turning-lathes and heel turning machines.

The improved apparatus is characterized in that the bracket, in which the work is clamped so that it can be easily interchanged, is mounted so as to be capable of oscillatory movements in horizontal and vertical planes. This compound movement is communicated to the bracket by two eccentrics or the like co-operating therewith, which roll on adjustable rollers, whereby the character of the compound-movement can be altered. The work clamped in the movable bracket is constantly pressed at a certain pressure against the rotating milling cutter. By this compound-movement it is possible to produce profiled elements of irregular cross-section, such as for example certain kinds of spokes, boot-heels and the like. When one of the eccentrics is disengaged, the apparatus may be used for producing articles of symmetrical cross-section, the bracket in this case carrying out only one of the oscillatory movements.

The shape of the work may be further influenced by imparting to the bracket, carrying the work, besides an oscillatory movement in horizontal and vertical planes, a movement in longitudinal direction. This longitudinal movement is positive and can be produced for instance by the rotating movement of the bracket. Instead of shifting the rotatable and oscillatable bracket in longitudinal direction, the milling cutter or the cutter-shaft might be shifted in longitudinal direction at the correct movement.

The machine is further combined with an apparatus for grinding the milling cutter so that, when the knives have become blunt, they can be sharpened in the machine.

An embodiment of the invention is illustrated, by way of example, in the accompanying drawings, in which:

Fig. 1 is a side-elevation, partly in longitudinal section showing the apparatus.

Fig. 2 is a horizontal section on line II—II of Fig. 1.

Fig. 3 is a vertical section of Fig. 1.

Fig. 4 is a front-elevation, showing the form of construction in which the bracket is shiftable in longitudinal direction.

Fig. 5 is a top-plan-view of Fig. 4, partly in section.

Fig. 6 shows the apparatus with cutter-shaft shiftable in longitudinal direction.

Fig. 7 shows a boot-heel produced in the machine shown in Figs. 4 to 6.

On the base-plate 94 a rotatable element 101 is oscillatably mounted on an axle 102. On this element 101 a bracket 2 is mounted so that it can pivot in a horizontal plane around a bolt 48 and so that it is capable to carry out oscillatory movements in vertical and horizontal planes. In the bracket 2 two shafts 41, 42 are journalled on which two eccentric disks 40, 40' are interchangeably fixed. The two shafts 41, 42 are connected the one with the other by a clutch-element 43, easy to remove. On the shaft 42 a bevel-wheel 27 is keyed which meshes with the bevel-wheel 26. On the axle of bevel-wheel 26 a hand-wheel 25 is fixed, designed to rotate the coupled shafts 41, 42. Above the shafts 41, 42 a hollow shaft 7 and a shaft 28 are journalled in the sides 1, 1' of bracket 2. On the ends of the hollow shaft 7 and of shaft 28 the chuck elements 5, 6 are arranged between which the work, for instance a boot-heel, is to be clamped and held. The shafts 7 and 28 are driven from the shafts 41, 42 by means of gear-wheels 24, 23, 22 and 24', 23' and 22'. The intermediate gear-wheels 23 and 23' are journalled in the sides 1 and 1' of bracket 2, the other gear-wheels being mounted on the shafts 41 and 42 and 7, 28 respectively. The work, clamped between the chuck-elements 5, 6 on the shafts 7, 28, is thus rotated in front of the rotating profiled cutter 58 when the hand-wheel 25 is being rotated. The bracket 2 may be pressed against the cutter 58 by hand or spring.

Behind the eccentrics 40, 40' rollers 47, 47' are adjustably mounted on which said eccentrics roll, whereby to the bracket 2 and to the work-clamped in the same, oscillatory movements in vertical and horizontal planes are simultaneously communicated.

The rollers 47, 47' serving as abutments are mounted at either side of the pivot bolt 48 and so that they bear against the eccentrics 40, 40'. The bracket 2 is permanently pulled by pull-springs 51 against the rollers 47, 47'. Owing to the arrangement of the rollers 47, 47' rotation of the bracket 2 around the pivot-bolt 48 is facilitated. By adjusting the rollers 47, 47' with regard to the eccentrics the amplitude of the movement of the bracket may be increased or decreased whereby to the work any designed shape can be given.

By the rotation of the hand-wheel 25 the work is rotated and is completely cut after one revolution. The milling cutter 58 on shaft 56 is driven by a belt-pulley not shown. By the rotation of the hand-wheel 25 the eccentrics 40, 40' are rotated at the same time so that the bracket is positively oscillated around an axle 102 and at the same time rotated around the pivot-bolt 48.

The shape of the eccentrics is so that, owing to their co-operation, they give to the work the desired shape. The eccentrics 40, 40' press the work against the rotating cutter in such a manner that a curve is produced and that, according to the kind of eccentrics, any desired shape may be given to the work determined by the adjusting of the rollers 47, 47'. The work is clamped between the chuck elements 5, 6 arranged on the opposite ends of the shafts 7 and 28. The hollow shaft 7 is journaled at the one end in the side wall 1 of the bracket 2 and at the other end in the pressure-bearing 8. The rear end 9 of shaft 7 is threaded and a milled nut 10 is screwed onto the threaded portion 9 and connected by means of an arm 11 with a guide sleeve 12 so that this guide sleeve can shift in axial direction. On the bottom plate 13 of sleeve 12 the chuck element 14 is fixed, which has a rubber plate 12'. On the guide sleeve 12 an open sleeve 15 is arranged so that it can be shifted in longitudinal direction, said open sleeve holding the work at one of its ends. The sleeve 15 is guided by means of a pin 16 fixed in a shiftable bolt 17 so that by the shifting of bolt 17 in longitudinal direction the sleeve 15 can execute an axial shifting movement. On the outer end of bolt 10 a ring 18 is adjustably fixed which has on its inner side a bevelled surface adapted to move on a cam arranged on the bearing shield 19. The bolt 17 participates in the rotation of the shaft 7 so that the bevelled face of ring 18 runs up on the cam 19, and the sleeve 15 connected with the same by a pin 18 is pulled back, so that the portion of the work which has been covered can then be worked. As soon as the bevelled face of ring 18 moves away from the cam, the bolt 17 and with the same the sleeve 15, are pushed back into their initial position by the action of spring 20. The sleeve 15 encloses partly the work to be treated so that it more securely holds the same. The pulling back of the sleeve 15 from the work (heel) takes place at the moment, at which the portion which had been covered by the sleeve 15 is worked by the cutter 58. After the working of the covered portion the sleeve 15 returns into its initial position. The cam 19 and the bevelled face of ring 18 are arranged in such a manner that the pulling back of the sleeve 15 takes place at the correct moment. A nut 21 arranged on the bolt 17 serves for adjusting the stroke of the sleeve from case to case. The nut 10 serves for regulating the clamping width between the chuck elements 5 and 6. The chuck element 6 is mounted on an axle 28 and on a bush 29 pushed over the same. On a tapered portion 30 of axle 28 a catch head 31 having a stud 31' is arranged so that it can be shifted in longitudinal direction. In the head 31 a nut 33 is screwed on the threaded portion 32 and serves as supporting plate and at the same time as ejector for the work and as abutment for a spring 34 arranged in the catch head 31. On the threaded portion 35 of the catch head 31 a milled nut 36 is screwed, which is loosely mounted on the axle 28 and by means of which the catch head 31 can be moved towards or away from the chuck element 5, so that shorter or longer work can be clamped between the chuck elements 5, 6. On the bush 29 a clamping lever 37 having cams is pivotally mounted, which bears against a cam ring 38 and is connected with the milled nut 36 by means of a pressure bearing 39. Prior to the beginning of the working of a series of similar articles the distance between the two chuck elements 5, 6 is regulated, on the one hand, by means of the milled nut 10 and, on the other hand, by means of the milled nut 36 so that the work can be readily inserted or removed. After this provisional adjusting has been carried out once, the clamping lever 37 has merely to be turned forward or backward at the inserting or removing of any following work, in order to effect the secure clamping of the work or the releasing of the same. The longitudinal adjusting of the work can preferably be effected by the nut 10. Articles of one and the same series might be of different lengths. These differences are equalized by means of the nut 36. On the one end of the hollow shaft 41 and of the short shaft 42 flat faces 44 are provided over which slit-like slots 45 of the coupling element 43 are pushed (Figs. 1 and 2). The clutch element 43 with its slit-like slots 45 is secured against dropping out by screwing the screw-bolt 46 of the hollow shaft 41 into the short shaft 42. When the eccentrics 40, 40' have to be interchanged for working articles of other kind, the screw 46 is unscrewed, whereupon the clutch-element 43 can be removed and the eccentrics 40, 40' can be removed from the shafts 41, 42. Owing to this arrangement the eccentrics 40, 40' can be interchanged easily and readily. As protection against accidents a mechanically operated protecting hood 96 is mounted over the profile-cutter 58, by means of which this cutter is covered during its rotation at the inserting of the work but liberated for working the article (Fig. 5). The protecting hood 96 is pivotally mounted on a transverse bolt 97. A lever 98 hingedly mounted on the protecting hood 96 is hingedly connected at the other end with the lever 99, pivotally mounted in a bracket 50'. The free end of lever 99 rests on an eccentric 100, keyed on the clutch-element 43'. When the clutch-element 43 and through the same the eccentric 100 is rotated by means of the hand-wheel 25, the protecting hood 96 is lowered through the intermediate levers 98, 99 so that it covers the cutter at the inserting of the work or uncovers the same for the working of the work, the latter position being indicated in dash-lines in Fig. 3.

The shape of the work can further be influenced by a longitudinal shifting movement of the bearing bracket 2 or of the cutter shaft. When the bearing bracket 2 is being shifted, an oscillatable element 101, having lugs 103 and 103', is shifted in longitudinal direction by means of these lugs on an axle 102. (Figs. 6 and 7.) On the axle 102 an adjusting ring 104 is fixed between the lugs 103, 103', against which bears one end of a spring 105, wound around the axle 102, the other end of said spring bearing against the lug 103 and pressing the oscillatable piece 101 with the bearing bracket 2 permanently against a lug 122 of the base-plate 121. The lugs 103, 103' are arranged on the oscillatable element 101 so that an interval exists between the lug 103' and the lug 122' of the base-plate, and the element 101 can carry out a shifting movement in lateral direction in opposition to the action of spring 105. On the bearing bracket 2 an abutment arm 106 is arranged, the end 108 of which bears against an upwardly inclined surface 107. A deflecting plate 109 is fixed on the base-plate 121. During the cutting of the work the bearing bracket 2 is oscillated in the direction of the arrow line (Fig. 7) around the bolt 48 by the action of the rollers 47, 47', acting upon the eccentrics 40, 40'. At this oscillating movement of the bracket 2 the arm 106 slides along the horizontally inclined face 107 of the deflecting plate 109 and displaces thus in lateral direction, in opposition to the spring-pressure, the bracket 2 carrying the article the oscillatable element 101 being similarly displaced at the same time. The bracket 2 might be shifted evidently also in opposite direction, the deflecting device having then to be constructed so that it acts in opposite direction. The spring 105 must in this case also act in the opposite sense. In this manner the heel 120 is, during the working, also shifted in lateral direction so that the shape shown in Fig. 9 is obtained. The dash-lines in Fig. 4 indicate the shape of a heel which is obtained when the work is not shifted in lateral direction.

Fig. 6 shows another mechanism for the production of a heel in which not the work but the cutter working on the work is shifted in the direction of its longitudinal axis. On a shaft 111 carrying the cutter, a grooved ring 112 is fixed. With the groove 113 of the ring 112 engage catch-bolts 115, fixed in the bow-shaped end 114 of a two armed lever 116. This lever 116 is pivotally mounted in a bracket 117, and it carries in its other end a roller 118 which engages with a curved groove of a cam-disk 123 keyed on an axle 119. This cam-disk 123 is also rotated from the hand-wheel 25. The cam-disk 123 is constructed so that the cutter-shaft or the cutter 58 carries out during the working of the work at the correct moment a shifting movement in the direction of the arrow-line (Fig. 6). The cutter 58 might be controlled so that it is shifted in the opposite direction, when this should be necessary for the working of certain profiled articles.

I claim:

1. A machine for milling and planing profiled elements of any kind of wood and similar material, comprising in combination a stationary cutter, a horizontal axle, a bearing bracket, in which the article is rotatably mounted so that it can be easily interchanged, oscillatably mounted on said horizontal axle, eccentrics controlling the movements of said bearing bracket with regard to said stationary cutter, and an axle perpendicular to said horizontal axle around which said bearing bracket is adapted to rotate.

2. A machine for milling and planing profiled elements of any kind of wood and similar material, comprising in combination a stationary cutter, a horizontal axle, a bearing bracket, in which the article is rotatably mounted so that it can be easily interchanged, oscillatably mounted on said horizontal axle, an axle perpendicular to said horizontal axle around which said bearing bracket is adapted to rotate, and two eccentric disks co-operating with said bearing bracket to communicate to said article oscillating movements in horizontal and vertical planes whereby to the article pressed against the tool any desired shape can be given.

3. A machine for milling and planing profiled elements of any kind of wood and similar material, comprising in combination a stationary cutter, a horizontal axle, a bearing bracket, in which the article is rotatably mounted so that it can be easily interchanged, oscillatably mounted on said horizontal axle, an axle perpendicular to said horizontal axle around which said bearing bracket is adapted to rotate, two eccentric disks co-operating with said bearing bracket to communicate to said article oscillating movements in horizontal and vertical planes whereby to the article pressed against the tool any desired shape can be given, and adjustable rollers against which said eccentric disks bear, and adjustable bearings for said rollers whereby the movement of said article towards the tool can be altered.

4. A machine for milling and planing profiled elements of any kind and shape of wood, leather and the like, comprising in combination a bearing bracket in which the article is fixed so that it can be easily interchanged, an oscillatable element carrying said bearing bracket, and means for communicating to said bracket and to said oscillatable element oscillatory movements in horizontal and vertical planes whereby to the article pressed against the tool any desired shape can be given.

5. A machine for milling and planing profiled elements of any kind and shape of wood, leather and the like, comprising in combination with the base plate a bearing bracket in which the article is fixed so that it can be easily interchanged, an oscillatable element carrying said bearing brackets, a horizontal axle mounted on said base plate, lugs projecting from said oscillatable element adapted to slide on said horizontal axle a vertical pivot axle for said bracket, an abutment on said bracket, means for rotating said bracket and a deflecting plate having an inclined face against which said abutment bears when said bracket is rotating so that the shifting in longitudinal direction of said bracket is caused at the rotation of said bracket by said abutment sliding along said inclined face on said deflecting plate and said lugs sliding along said horizontal axle.

6. A machine for milling and planing profiled elements of any kind and shape of wood, leather and the like, comprising in combination a bearing bracket in which the article is fixed so that it can be easily interchanged, a chuck in said bearing bracket, a cutter-shaft above and parallel to said chuck, a cutter on said shaft, and means for shifting said cutter in the direction of the longitudinal axis.

7. A machine for milling and planing profiled elements of any kind and shape of wood, leather and the like, comprising in combination a bearing bracket in which the article is fixed so that it can be easily interchanged, a chuck in said bearing bracket, a cutter-shaft above and parallel to said chuck, a cutter on said shaft, a ring-shaped collar on said cutter-shaft, an axle, parallel to said cutter-shaft, a cam-disk on said axle, a gear for rotating said axle, a hand-wheel for operating said gear, and an oscillatable lever, engaging on the one hand with said grooved collar on said cutter-shaft and on the other hand with the groove of said cam-disk for controlling the shifting movement of said cutter-shaft.

8. A machine for milling and planing profiled elements of any kind and shape of wood, leather and the like, comprising in combination a bearing bracket in which the article is fixed so that it can be easily interchanged, two short shafts journaled in the arms of said bracket, a chuck-element on the inner end of each of said short shafts for clamping the article, a milled nut on the outer end of each chuck-element adapted to be rotated to shift said chuck-elements in the direction of the longitudinal axis to regulate the distance between said chucks, a lever having an inclined face loosely mounted on one of said short shafts, a sleeve shiftably mounted on the other chuck-element for gripping over the article, a guide-sleeve on said second mentioned chuck, a bolt extending into said sleeve, and a ring on said bolt for pulling during the cutting said covering sleeve over said guide-sleeve so that also that portion of the article which had been covered by said holding sleeve can be shaped.

9. A machine for milling and planing profiled elements of any kind and shape of wood, leather and the like, comprising in combination a bearing bracket in which the article is fixed so that it can be easily interchanged, two short shafts journaled in the arms of said bracket, a chuck-element on the inner end of each of said short shafts for clamping the article, a milled nut on the outer end of each chuck-element adapted to be rotated to shift said chuck-elements in the direction of the longitudinal axis to regulate the distance between said chucks, a lever, having an inclined face, loosely mounted on one of said short shafts, a sleeve, shiftably mounted on the other chuck-element for gripping over the article, a guide-sleeve on said second mentioned chuck, a bolt extending into said sleeve, a ring on said bolt for pulling during the cutting said covering sleeve over said guide-sleeve so that also that portion of the article which had been covered by said holding sleeve can be shaped, and two sets of gear-wheels for driving each one of said chuck-elements so that the clamping device can be rotated simultaneously and uniformly from both sides.

10. A machine for milling and planing profiled elements of any kind and shape of wood, leather and the like, comprising in combination a bearing bracket in which the work is fixed so that it can be easily interchanged, and means for communicating to said bracket oscillatory movements in horizontal and vertical planes whereby to the work pressed against the tool any desired shape can be given, in combination with the bearing bracket, two short shafts journalled in said bearing bracket, an eccentric on the inner end of each short shaft shiftable in longitudinal direction, removable and adapted to act upon said bearing bracket, a coupling element, and a bolt for rigidly connecting said short shafts, the one with the other to facilitate the interchanging of said eccentrics.

11. A machine for milling and planing profiled elements of any kind and shape of wood, leather and the like, comprising in combination a bearing bracket in which the work is fixed so that it can be easily interchanged, and means for communicating to said bracket oscillatory movements in horizontal and vertical planes whereby to the work pressed against the tool any desired shape can be given, in combination with the bracket carrying the article, two eccentrics influencing said bracket, a pivot-bolt for said bracket, and two rollers one for each eccentric arranged at either side of said pivot-bolt and supporting said eccentrics so that the action of the same upon said bracket remains uniform.

12. A machine for milling and planing profiled elements of any kind and shape of wood, leather and the like, comprising in combination a bearing bracket in which the work is fixed so that it can be easily interchanged, and means for communicating to said bracket oscillatory movements in horizontal and vertical planes whereby to the work pressed against the tool any desired shape can be given, in combination with a cutter and the chucks for holding the article, a mechanically operated covering hood for said cutter, two short shafts carrying said chucks, a shaft parallel to said chuck-shafts, a clutch element on said parallel shaft, an eccentric on said parallel shaft, and a system of hinged levers standing at right angles the one to the other the vertical lever being hingedly mounted at the upper end on said protecting cover and the free end of the horizontal lever standing underneath said parallel shaft so that at the inserting of the article said covering hood is automatically lifted by said eccentric to be lowered, when said cutter is being started for shaping the article.

In testimony whereof I affix my signature.

PAUL BASTIAN, Jr.